United States Patent [19]

Chennakeshu et al.

[11] Patent Number: 5,283,815

[45] Date of Patent: * Feb. 1, 1994

[54] TANGENTAL TYPE DIFFERENTIAL DETECTOR FOR PULSE SHAPED PI/4 SHIFTED DIFFERENTIALLY ENCODED QUADRATURE PHASE SHIFT KEYING

[75] Inventors: Sandeep Chennakeshu, Clifton Park; Gary J. Saulnier, Rexford, both of N.Y.

[73] Assignee: General Electric Company, Schenectady, N.Y.

[*] Notice: The portion of the term of this patent subsequent to Apr. 13, 2000 has been disclaimed.

[21] Appl. No.: 703,637

[22] Filed: May 21, 1991

[51] Int. Cl.⁵ .............................................. H04L 27/22
[52] U.S. Cl. ...................................... 375/84; 329/304; 455/60
[58] Field of Search ........................ 375/80, 82, 83, 84, 375/85; 379/304, 309; 455/60

[56] References Cited

U.S. PATENT DOCUMENTS

| | | | |
|---|---|---|---|
| 4,379,266 | 4/1983 | Rubin | 375/83 |
| 4,570,126 | 2/1986 | Demmer et al. | 375/82 |
| 4,773,083 | 9/1988 | Baumbach et al. | 375/82 |
| 4,814,719 | 3/1983 | Guyer | 375/83 |

OTHER PUBLICATIONS

T. S. Rappaport, S. Y. Seidel and R. Singh. "900 MHZ Multipath Propagation Measurements for U.S. Digital Cellular Radiotelephone." IEEE Globecom Conference Record, Nov. 1989, Dallas, Tex. vol. 1, pp. 3.2.1–3.2.6.

Motorola, Inc., Arlington Heights, Ill., "Discussion of Pi/4 Shift DQPSK." Submitted to the TIA Technical Subcommittee, TR-45.3 WG III Modulation Task Force, Washington, D.C. pp. 1–13.

G. J. Saulnier; C. McD. Puckette, IV; R. C. Gaus, Jr.; R. J. Dunki-Jacobs and T. E. Thiel. "A VLSI Demodulator for Digital RF Network Applications: Theory and Results." IEEE Journal on Selected Areas in Communications, Oct. 1990, vol. 8, No. 8, pp. 1500–1511.

Primary Examiner—Curtis Kuntz
Assistant Examiner—T. Ghebretinsae
Attorney, Agent, or Firm—Marvin Snyder; Lawrence P. Zale

[57] ABSTRACT

A digital radio receiver for synchronization of radiowave transmissions for digital and analog FM signals in TDMA systems such as cellular telephones uses a tangent type differential detector that minimizes the bit error rate. The differential detector employs an A/D converter circuit that samples a received signal, a sorter circuit that selects a predetermined number of samples to be used in the decoding, a sample and phase adjustment circuit that allows for a carrier phase adjustment and sample timing adjustment, a divider circuit that eliminates the need for a conventional limiter by causing a ratio of amplitudes to be processed instead of absolute signal amplitudes, an inverse tangent circuit creates a decoded phase angle from the ratio, a delay circuit and a summer circuit that create a differential signal, a modulo-$2\pi$ correction circuit that corrects for wrap-around errors about the real axis, and a four-phase decoder circuit to decode the signal into a pair of bits. An adjustment circuit minimizes phase error between a reference sequence of symbols and the decoded symbols by simultaneously adjusting the sample timing and carrier phase adjustments. The differential detector can be modified to decode conventional analog FM radio broadcasts by processing more samples per symbol, deactivating the adjustment circuit, and the SPA circuit, and bypassing the four-phase decoder.

6 Claims, 10 Drawing Sheets

TANGENTAL TYPE DIFFERENTIAL DETECTOR FOR PULSE SHAPED PI/4 SHIFTED DIFFERENTIALLY ENCODED QUADRATURE PHASE SHIFT KEYING

CROSS REFERENCES TO RELATED APPLICATIONS

This application is related to applications "SAMPLE TIMING AND CARRIER FREQUENCY ESTIMATION CIRCUIT FOR SINE-COSINE DETECTORS" by Sandeep Chennakeshu and G. J. Saulnier, U.S. Pat. No. 5,151,926 and also "DIGITAL DISCRIMINATOR FOR PULSE SHAPED π/4 SHIFTED DIFFERENTIALLY ENCODED QUADRATURE PHASE SHIFT KEYING" by Sandeep Chennakeshu and G. J. Saulnier, U.S. Pat. No. 5,202,901 both filed simultaneously with this application, and also assigned to the present assignee. These applications are hereby incorporated by reference.

BACKGROUND OF THE INVENTION

1. Field of the Invention

This invention relates to digital radio systems, and more specifically, to demodulation of a transmitted signal and synchronization between the transmitter and receiver of digital radio systems.

2. Description of Related Art

The U.S. digital cellular telephone system uses time division multiple access (TDMA) as the channel access method. In this system, typically 3 to 6 users (data channels) share a common 30 KHz channel. Each user transmits data in an assigned time slot that is a part of a larger frame. Typically the gross bit rate of the data to be transmitted over the mobile channel is 48.6 kilobits per second (kbps). The modulation method is π/4 shifted-Differentially encoded Quadrature Phase Shift Keying (DQPSK). A typical system uses a Square Root Raised Cosine transmit pulse shape for a transmission signal with a roll-off of 0.35, or an excess bandwidth of 35% to shape the transmitted data. A filter having an impulse response matched to the transmit pulse shape is used in the receiver. Coherent detection, differential detection, or discriminator detection may be used to demodulate signals encoded by π/4-shifted-DQPSK techniques.

Disturbances due to multipath propagation affect the digital cellular transmission and require the use of an equalizer in the receiver. Equalizers employ coherent demodulation and are complex to implement. With present technology, the complexity of an equalizer makes its use in portable radio receivers impractical. For such applications a digital discriminator or a differential detector is more suitable. These receivers are relatively simple and can be implemented on a commercial digital signal processor (DSP), which forms the core of a modern digital mobile radio receiver.

When transmission introduces echoes in the received signal, due to multipath propagation, the bit error rate (BER) performance of these detectors degrades very rapidly. Multipath propagation manifests itself in dispersion of the transmitted signal. This dispersion is characterized by a quantity called delay spread. Delay spread can be defined as the time interval between the first arriving signal and last significant echo. However, in most regions of cellular operation in the U.S., the root mean square (RMS) delay spread will not exceed 14 microseconds or approximately 34% of a symbol duration at this transmission rate [see, T. S. Rappaport, S. Y. Seidel and R. Singh, "900 MHz Multipath Propagation Measurements for U.S. Digital Cellular Radiotelephone", IEEE GIobecom Conference Record, Vol. 1, pp. 3.2.1–3.2 6, Nov. 1989, Dallas, Tex.] and hence degradation can be expected to be within acceptable limits.

The conventional discriminator comprises the following sequence of processing functions: limiting, differentiation, envelope detection, and integration. Specifically, after the RF signal is received, it is heterodyned down by conventional methods to an intermediate frequency (IF). The signal is then limited by normalizing its amplitude to a constant value with a limiter. A differentiator and an envelope detector convert frequency to a signal voltage. This type of discriminator can also be used to demodulate analog FM and digital π/4-shifted-DQPSK signals [see, "Discussion of π/4-Shifted-DQPSK", TR45.3.3/89.3.14.5, submitted to TIA Technical Subcommittee TR45.3, WG III, Modulation Task Group, Mar. 14, 1989, available from the Electronics Industries Assoc., Engineering Dept., 2001 Eye Street, N.W., Washington, D.C. 20006).

A drawback to the above described conventional discriminator is the presence of the limiter. The limiter makes the discriminator sensitive to the pulse shaping roll off factor of the transmitted pulse signal. An increase in BER occurs by reducing the roll-off factors or by reducing the excess bandwidth of the transmitted signal. This puts a restriction on the data rate and the filtering in the system.

A second deficiency in the conventional discriminator is the inability to recover symbol timing and to correct carrier frequency errors. Typically, these conventional discriminators require additional circuits having phase locked loops (PLLs) to perform these functions.

It would be advantageous to create a simplified detector that does not require a limiter, and is able to recover symbol timing and to correct carrier frequency errors.

SUMMARY OF INVENTION

A digital receiver employing a detector for demodulating π/4-shifted-DQPSK signals and providing synchronization in a TDMA system such as digital cellular telephones also includes a heterodyne circuit for converting a received radio frequency signal to an intermediate frequency (IF) signal by a heterodyne circuit. An analog-to-digital (A/D) converter circuit that employs complex sampling of the IF signal is used to produce the baseband (low pass) signal. This baseband signal comprises a quadrature coefficient and an in-phase coefficient for each sample of the IF signal. The samples are passed to a sorter circuit that selects samples to be used in the decoding.

A sample and phase adjustment (SPA) circuit receives a pair of coefficients for each sample and selects a sample of the received signal based upon sample timing it receives. The SPA circuit also receives, as a feedback signal, a carrier phase adjustment and converts each sample it receives to a new quadrature coefficient and in-phase coefficient based upon this adjustment. A single output sample from the SPA circuit comprises a symbol.

A divider circuit receives the quadrature coefficient from the SPA circuit, and divides it by its corresponding in-phase coefficient to create an output sample representing a tangent of a signal phase angle for a symbol.

An inverse tangent circuit receives each tangent of the signal phase angle and creates an output sample representing a decoded phase angle.

A delay circuit delays the decoded phase angle for the duration of a symbol period and then passes it to a summer circuit. The summer circuit receives the output sample of the inverse tangent circuit and subtracts from it the output sample of the delay circuit to create a relative phase angle.

A modulo-$2\pi$ correction circuit receives the relative phase angle signal and corrects for wrap-around to create a corrected relative phase angle signal. Wrap-around occurs when the angles straddle the 0 or $2\pi$ radian point, where an inherent discontinuity exists. This discontinuity causes uncertainties when a sample representing an angle that is between 0 and $\pi$ radians is subtracted from a sample being between $\pi$ and $2\pi$ radians, or vice versa. The modulo-$2\pi$ correction circuit corrects for this discontinuity. The relative phase angle signal also represents a symbol phase angle.

A four-phase decoder circuit receives the symbol phase angle and decodes the angle into a pair of bits that constitutes the decoded information.

Adjustments to sample timing and carrier phase are performed by an adjustment circuit that monitors the error between the decoded symbol phase angle and a predetermined information set (reference phase angles) provided by the preamble of each TDMA slot. The adjustment circuit provides the sample timing and the carrier phase adjustment to the SPA circuit. The SPA circuit chooses the best sample index within each symbol from the standpoint of reducing the bit error rate based upon the sample timing from the adjustment circuit. The SPA circuit recalculates a new quadrature coefficient and in-phase coefficient for the new samples that are chosen by the sorter circuit. The new quadrature coefficients and in-phase coefficients are passed to the divider circuit, the inverse tangent circuit, the delay circuit, and eventually to the adjustment circuit, until the best sample timing adjustment and the best carrier phase adjustment have been determined.

In an alternative embodiment, the carrier phase adjustment is not performed by the SPA circuit. Instead, the carrier phase adjustments are performed by a predecoding summer that adds the carrier phase adjustments to the samples before being decoded by the four-phase decoder, thereby reducing the degree of complexity in processing.

OBJECTS OF THE INVENTION

An object of the present invention is to create a simplified receiver for digital radio systems that employs a detector which does not require a limiter and is capable of recovering symbol timing and correcting carrier frequency errors.

Another object of the invention is to provide a simplified receiver for digital radio systems that employs a detector capable of decoding both digital and analog signals.

A further object of the invention is to provide a simplified receiver for digital radio systems that employs a detector that can quickly adjust to frequency differences between the transmitter and receiver oscillators.

A further object of the invention is to provide a simplified receiver for digital radio systems that employs a detector having a reduced bit error rate that is not sensitive to the degree of roll-off in the transmitted pulses.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
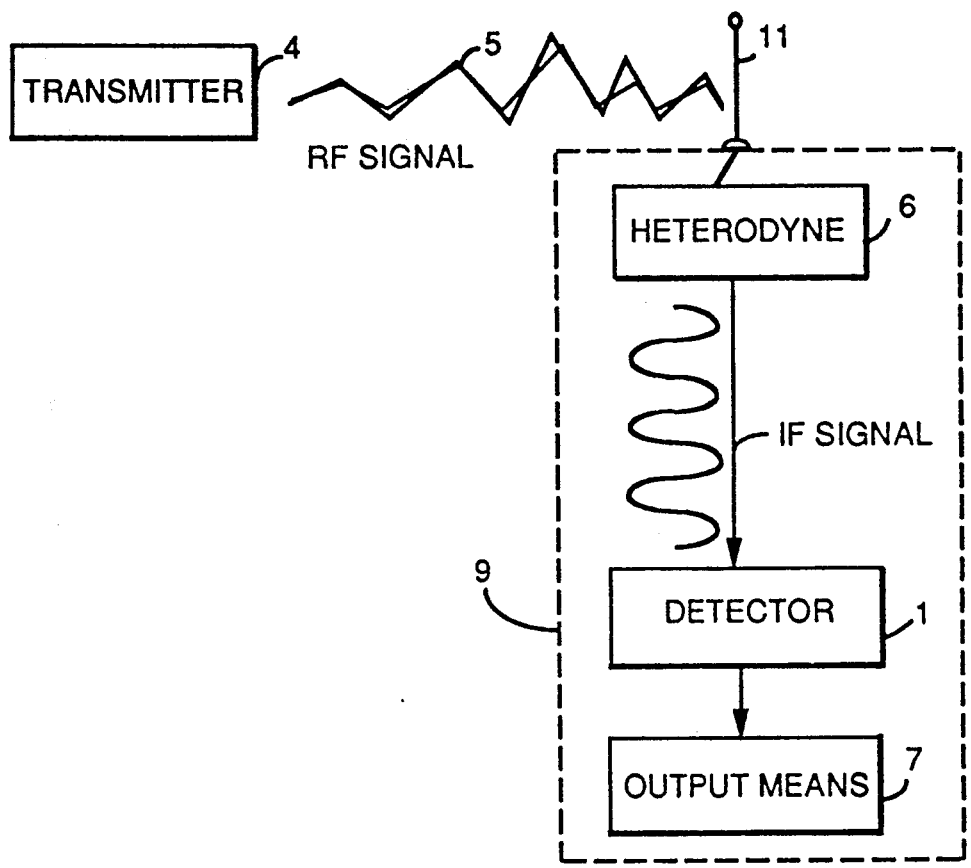
FIG. 1 is a block diagram of a generalized digital radio system.

FIG. 1 is a block diagram of a generalized digital radio system. Transmitter 4 transmits an encoded digital signal via radio waves as RF signal 5. This is received at an antenna 11 of receiver 9. The received RF signal, being approximately 900 MHz in frequency, is heterodyned down by heterodyne circuit 6 to an IF frequency of approximately 450-500 kHz and supplied to input 3 of an A/D converter 10, of detector 1. The IF signal 3 is then passed to detector 1. Detector 1 decodes the IF signal into a signal that can be utilized by output means 7. Output means 7 can be a speech synthesizer and loudspeaker to produce audible speech, a digital computer, or any other device which can make use of digital data.

FIG. 2a illustrates a basic TDMA frame structure. The TDMA frame structure 140 is broken down into a number of TDMA slots 142, 144, 146. FIG. 2b shows the Electronics Industries Assoc. IS-54 slot structure (for example slot 2 of FIG. 2a) for base to mobile transmissions used in U.S. digital cellular systems. This slot structure, which is 324 bits in length, begins with a preamble 166 being 28 bits long that contains synchronization words. Twelve slow associated control channel (SACCH) bits 168 are next. Data bits 174, being 130 bits long, follow SACCH bits 168. Twelve Digital Verification Color Code (DVCC) bits 176, 130 data bits 178 and twelve reserved bits 179 are at the end of the slot.

Figure 3:
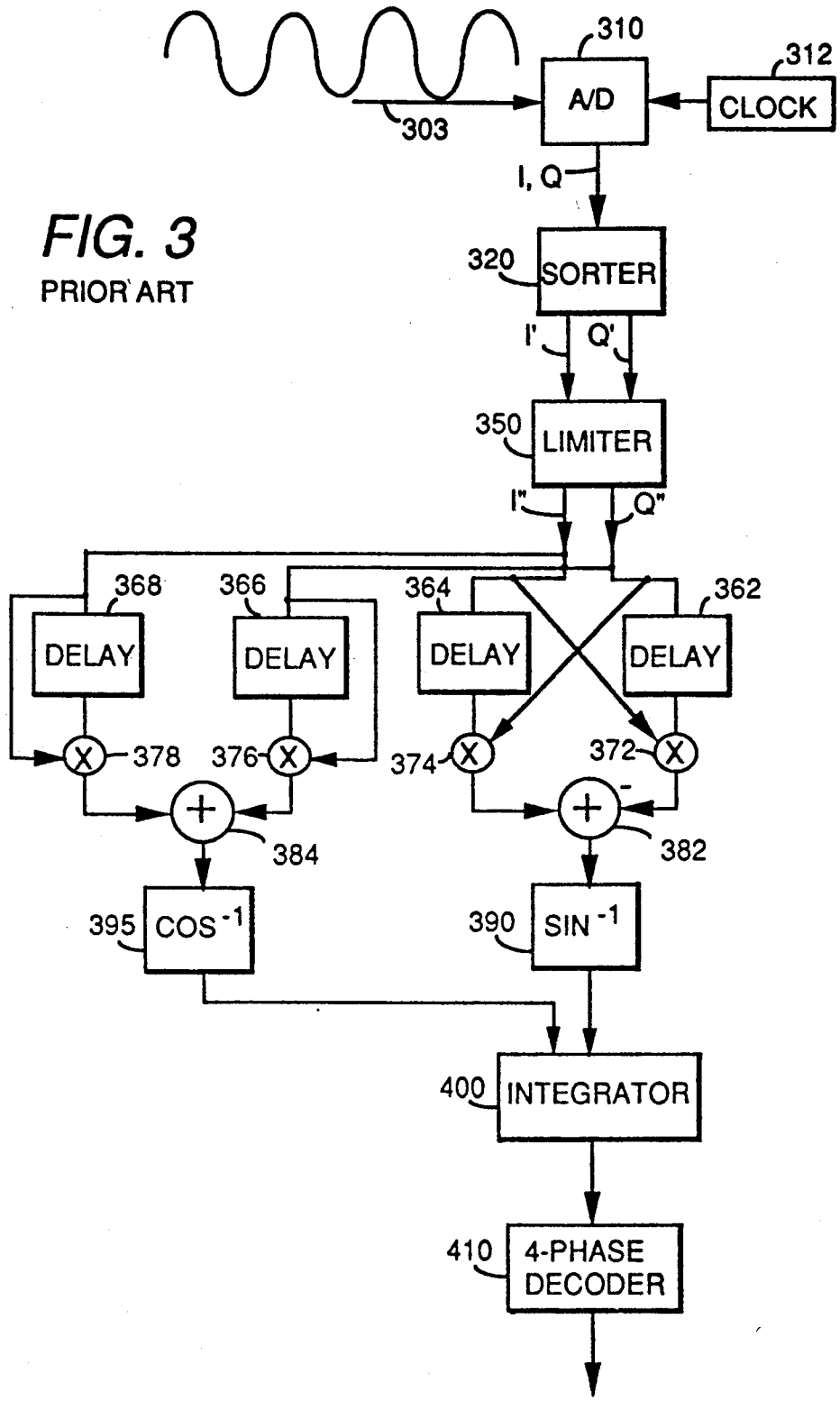
FIG. 3 is a block diagram of a prior art digital discriminator.

A conventional discriminator can be realized digitally as illustrated in FIG. 3. In this case the limiter must be employed at the low-pass stage in the receiver due to the direct digital conversion method used.

In the discriminator, an RF signal that has been converted to an IF signal 303 is substantially digitized through A/D converter 310 into samples (I,Q). The sampling rate is governed by sampling clock 312 running at four times the IF frequency. Sorter 320 selects samples (I',Q') to be used in decoding and discards the remaining samples. The coefficients (I',Q') are sent to limiter 350.

The output signal I'' from limiter 350 is multiplied in multiplier 372 by the previous Q'' sample that is temporarily held in delay circuit 362. Similarly the output signal Q'' is multiplied in multiplier 374 with the previous I'' sample which is held for a temporary period in delay circuit 364. The output signal of multipliers 372 and 374 are sent to summer 382 in which the signal from multiplier 372 is subtracted from the signal from multiplier 374. Inverse sine circuit 390 receives the output signal of summer 382 and creates an output signal corresponding to an inverse sine of the signals received.

Signal I'' is multiplied at multiplier 378 by a previous sample of I'' that is held in delay circuit 368. Similarly multiplier 376 multiplies the output signal Q'' by a previous sample of Q'' that is held in delay circuit 366. The output signals of multipliers 376 and 378 are added in summer circuit 384 to produce an output signal that is received by the inverse cosine circuit 395. The inverse cosine circuit 395 creates an output signal that is related to its input signal by an inverse cosine function. An integrator 400 receives the output signals of either the inverse sine circuit 390 or the inverse cosine circuit 395 and sums all the signals over a sampling period. A four-phase decoder 410 receives the output signal of the integrator 400 and decodes the encoded phase into a pair of bits for each symbol. (In the case of an analog FM signal the four-phase decoder 410 and integrator 400 are not required.)

Figure 4:
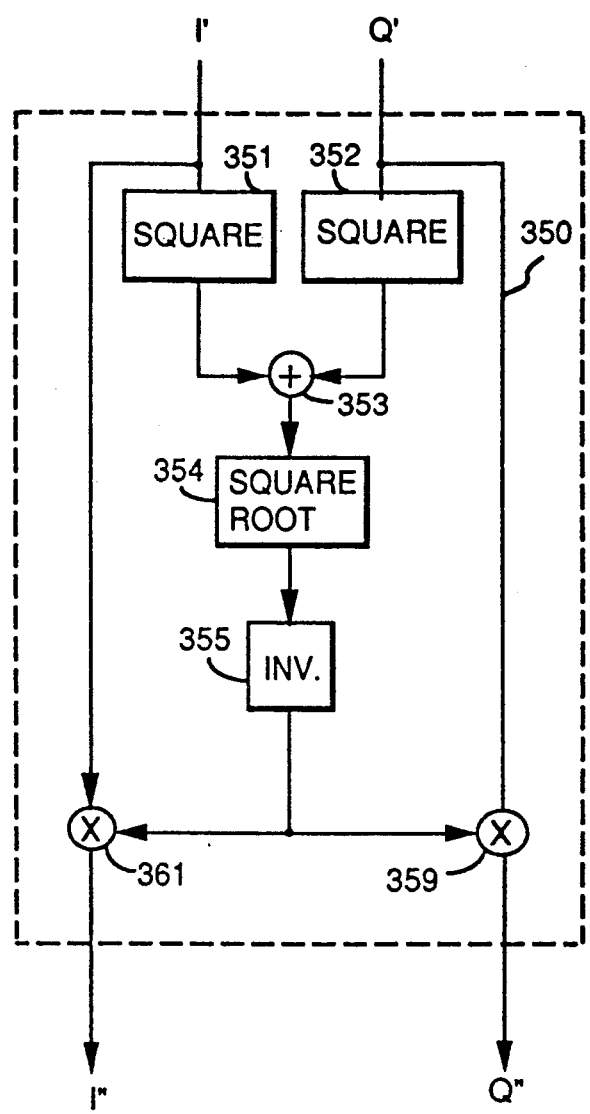
FIG. 4 is a block diagram of the limiter of FIG. 3.

FIG. 4 is an expanded view of the limiter 350. A square circuit 351 receives signal I' and squares the signal amplitude. A second square circuit 352 receives signal Q' and squares the signal amplitude. Summer 353 receives the signals from square circuits 351 and 352 and adds the two amplitudes. Summer 353 passes its output signal to square root circuit 354 where the square root of the output signal of summer 353 is taken. Inverter 355 creates an output signal that is the reciprocal of its input signal and sends it to multipliers 359 and 361. The output signal I'' of multiplier 361 is original signal I' that is multiplied by the signal from inverter 355. Similarly, the output signal Q'' of multiplier 359 is the product of Q' and the output signal from inverter 355. The output signal of limiter 350 is a normalized signal, comprising the output signals of multipliers 359 and 361.

Figure 5:
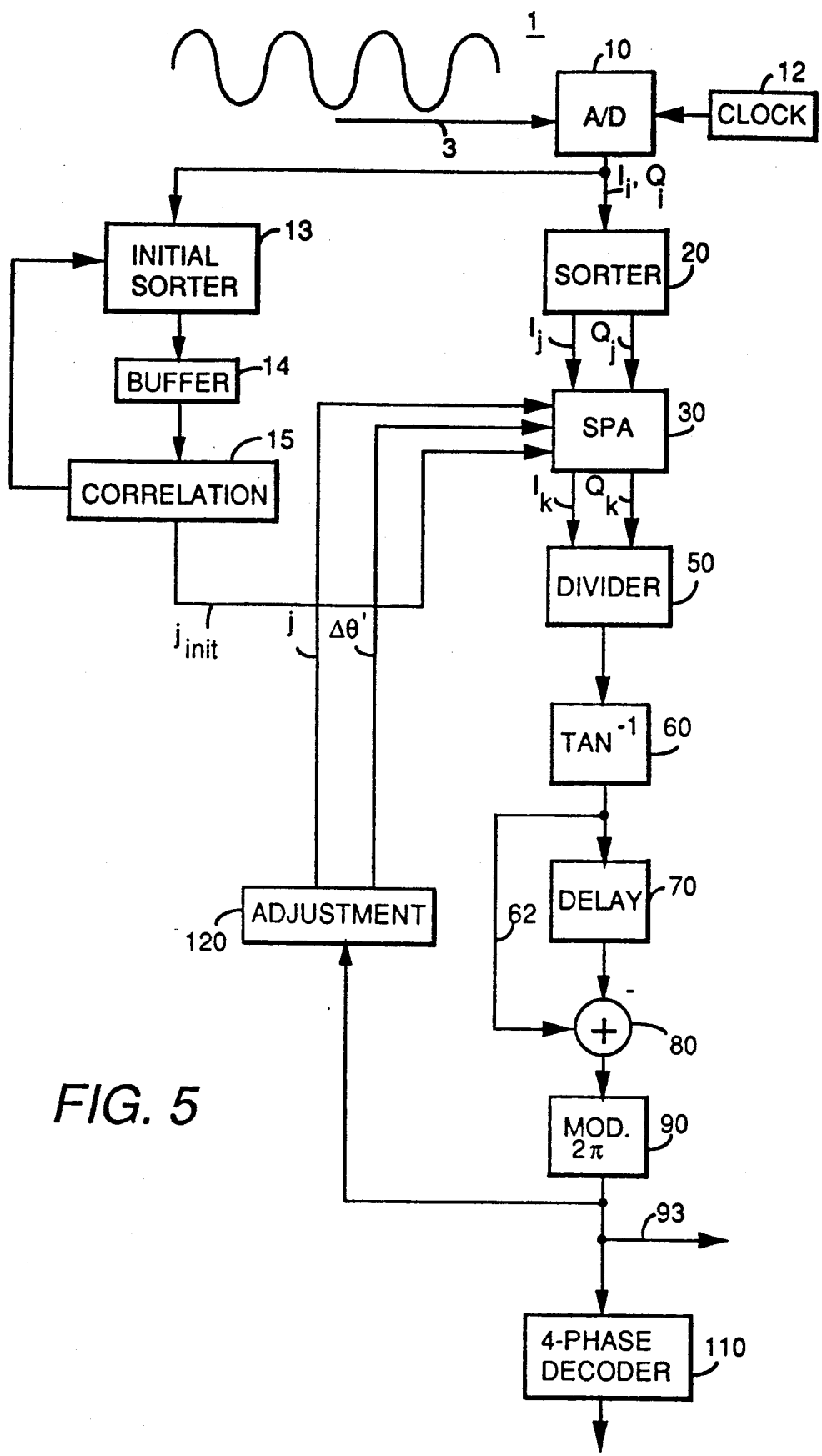
FIG. 5 is a simplified block diagram of a receiver employing one embodiment of a detector of the present invention.

FIG. 5 is a partial block diagram of a differential detector 1 employed in a receiver for digital radio systems according to the present invention, and as shown in FIG. 1. The IF signal 3 is converted to baseband using direct digital conversion. This conversion is accomplished by a flash A/D converter circuit 10 sampling the signal at four times the IF frequency or approximately 1800k samples/second. The sampling rate is governed by a sampling clock 12. The samples are quadrature phase shift keyed (QPSK) samples. The result is a pair of coefficients from each sample, being an in-phase coefficient $I_i$, and a quadrature coefficient $Q_i$, of the baseband $\pi/4$-shifted-DQPSK signal.

The detector operates by first establishing frame/slot synchronization to find a rough sample index. This is done by first selecting a number of samples with initial sorter 13 and storing these samples in a buffer 14. A correlation circuit 15 correlates a number of buffered samples pertaining to the length of the preamble 166 of FIG. 2b starting from an index with the predetermined preamble. The index marking the starting sample from which the received signal was correlated is incremented to the next sample. An appropriate number of symbols are selected, starting from the sample marked by the incremented index. This process of selecting samples and cross-correlating them with the preamble is repeated for several frames until the correlation produces several successive peaks that exceed a certain predetermined threshold. This sample index, $j_{init}$, is assumed to be the beginning of a frame and slot (hereinafter frame/slot). Since the number of samples in a frame is known, the beginning of the next frame can be calculated by incrementing the sample index by the number of samples that are in a frame. The correlation circuit then repeats the correlation process at the new sample index. If the correlation between the known preamble and the received symbols is above a predetermined threshold at this index, it can be assumed that this is the beginning of the next frame. If the correlation between the received symbols and the preamble is below the predetermined threshold, the search is started at the beginning again. If three successive correlation peaks are found, the frame/slot synchronization is complete, and the sample index $j_{init}$ is used as a starting point for a fine adjustment called symbol synchronization.

In symbol synchronization, a sorter circuit 20 processes the sequential string of samples $(I_i,Q_i)$ by retaining a predetermined number of samples and discarding the remaining samples, since most of these samples are redundant. The samples retained are determined by the sampling index j starting with $j_{init}$. The present embodiment starts with a total of eighty samples per symbol and retains ten samples per symbol. The number of samples discarded can be any number described by n where n=2*i; and i=1,3,5,7,9... It must be noted that the greater the number of samples discarded, the shorter the processing time but the greater the timing error. A further description of the functioning of the sorter circuit, can be found in to "A VLSI demodulator for digital RF Network Applications: Theory and Results", G. J. Saulnier et al., IEEE Journal on Selected Areas in Communications, Vol. 8, No. 8, pp. 1500–1511 October 1990, which is hereby incorporated by reference.

In the present invention, prior to establishing sample timing it is necessary to synchronize to a TDMA frame/slot. This can be done using a correlation with the preamble sequence contained within each slot. Assume that this timing can be established to be within $\pm N_1$ ($\leq N_s$) samples of the true location, where $N_s$ represents the number of samples per symbol. The best sample timing location must be selected from:

$$j = j_{init} \pm nT/N_s \qquad (1)$$

where T is a Symbol period, n=1,2,... $N_s$ and $j_{init}$ is the sample location corresponding to frame/slot sync.

In order to establish sample timing, as described by equation (1), and estimate carrier frequency offset, a 2-dimensional search is performed to find the sample time and phase rotation (corresponding to the frequency offset) that will minimize the bit error rate.

The coefficients $(I_j,Q_j)$ that are retained by the sorter circuit 20 for a given sample index j are then selected in pairs and adjusted for any frequency offset by the SPA circuit 30. The SPA circuit 30 synthesizes a new pair of coefficients $(I_k,Q_k)$ from coefficients $(I_j,Q_j)$ using an estimated phase adjustment $\Delta\theta_k$. The resulting signal coefficients $(I_k,Q_k)$ produced during a symbol interval are described below. (For simplicity of notation and description it is implicitly assumed that there is no fading or noise present in the system.) The coefficients $(I_k,Q_k)$ produced during a symbol interval can be represented as:

$$I_k = g_k \cos(\phi_k + \Delta\theta_k - \Delta\theta_k' + \epsilon) \qquad (1)$$

$$Q_k = g_k \sin(\phi_k + \Delta\theta_k - \Delta\theta_k' + \epsilon) \qquad (2)$$

where $\epsilon$ is an arbitrary phase $g_k$ is the amplitude of the sampled signal output $(I_i,Q_i)$ of A/D converter 10, $\phi_k$ is the information bearing phase angle at the $k^{th}$ sampling instant of the symbol, $\Delta\theta_k$ is the carrier phase rotation arising due to a frequency offset and $\Delta\theta_k'$ is the estimated phase adjustment to compensate for the offset between transmitter and receiver carrier phase angles. A new set of coefficients $(I_k,Q_k)$ is synthesized to compensate for differences in reference oscillator frequencies between transmitter and receiver. This difference causes continual phase shift differences which must be compensated for to reduce errors.

Figure 6A:
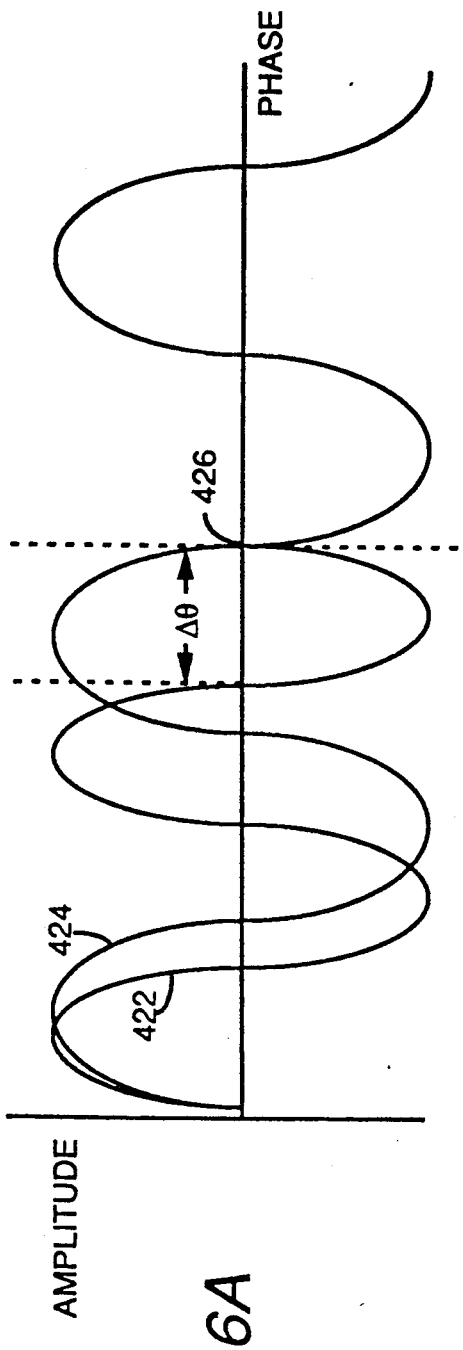
FIG. 6a and 6b are graphical representations of the carrier phase error incurred by carrier frequency offset, and the carrier phase adjustment, respectively.
Figure 6B:
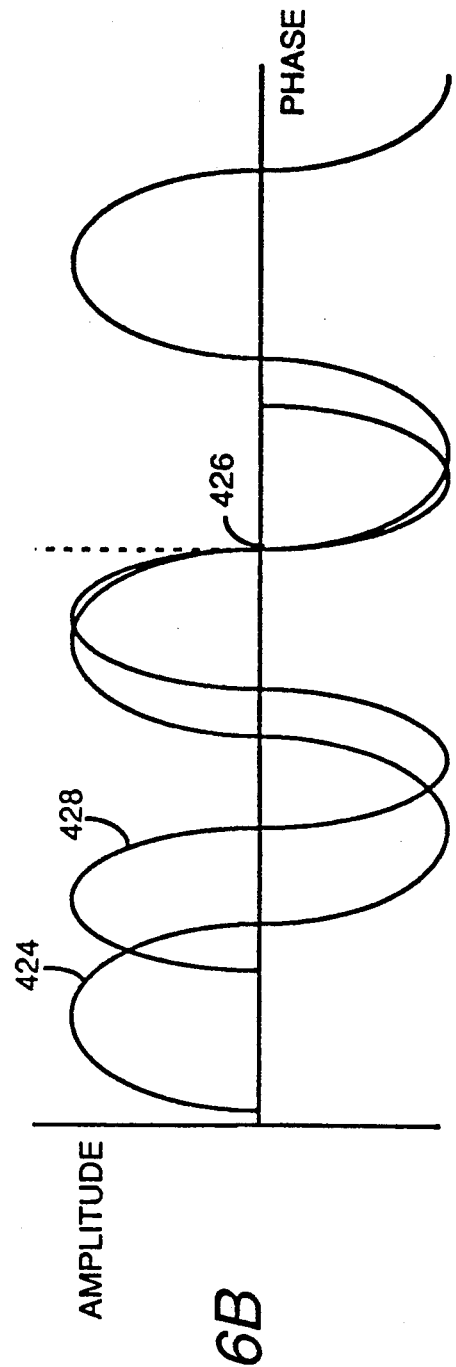

FIG. 6a shows waveform 422 that represents the carrier waveform as calculated by the receiver 9 of FIG. 1. Carrier waveform 424 represents the actual carrier waveform sent by transmitter 4 of FIG. 1. $\Delta\theta$ is a phase difference between waveforms 422 and 424 at sampling point 426 resulting from a slight difference in frequency between the transmitter and receiver. This difference in frequency may result from a mismatch in the oscillator frequencies of the transmitter and receiver. The present invention compensates for this phase shift $\Delta\theta$ by estimating the phase shift $\Delta\theta'$ and synthetically shifting waveform 422 forward, as shown in FIG. 6b such that waveforms 424 and 428 are in phase at sampling point 426.

The divider circuit 50 of FIG. 5 divides equation 2 by equation 1, or more specifically, divides coefficient $Q_k$ by $I_k$ to produce an output signal that represents a tangent of the signal phase angle, namely:

$$\frac{Q_k}{I_k} = \tan(\phi_k + \Delta\theta_k - \Delta\theta_k' + \epsilon) \qquad (3)$$

In the detector of FIG. 5 the use of a divider circuit 50 replaces the need for a limiter in the detector circuit of FIG. 3. The divider sets the complex envelope of the $(I_k,Q_k)$ coefficient pair to unity. In the absence of noise the divider circuit 50 removes the dependence of the $(I_k,Q_k)$ coefficients on the amplitude since the divider output signal represents a ratio.

The inverse tangent circuit 60 produces an output signal representing a phase angle that can be described as:

$$\tan^{-1}\frac{Q_k}{I_k} = \phi_k + \Delta\theta_k - \Delta\theta_k' + \epsilon \qquad (4)$$

Summer circuit 80 subtracts an angle delayed by delay circuit 70 from the output signal 62 of the inverse tangent circuit 60 representing the decoded phase angle, to produce an output signal representing a relative phase angle. This relative phase angle signal $(\Delta\phi_k)$ can be represented as:

$$\Delta\phi_k = \phi_k - \phi_{k-\Delta k} + \Delta\theta + \Delta\theta' \qquad (5)$$

where $\Delta\theta$ is the phase rotation between two samples and is fixed, and $\Delta\theta'$ is the corresponding fixed phase adjustment. Typically, $\Delta k$ corresponds to the sampling interval. $\Delta k$ in the present embodiment is equal to a symbol duration (T).

The relative phase angle signal is then received and processed by a modulo-$2\pi$ correction circuit 90, altering the phase of the signal as follows:

$$\text{IF } \Delta\phi_k < -180° \text{ THEN } \Delta\phi_k = \Delta\phi_k + 360° \qquad (6a)$$

and $$\text{IF } \Delta\phi_k > 180° \text{ THEN } \Delta\phi_k = \Delta\phi_k - 360° \qquad (6b)$$

producing a corrected relative phase angle output signal. This correction reduces the BER when successive angles wrap-around the real axis. The need for this correction is explained by the following example: Let $\phi_k = 5°$. $\phi_{k-\Delta k} = 355°$ and for convenience let $\Delta\theta' = \Delta\theta$. Then, without the modulo-$2\pi$ correction circuit, $\Delta\phi_k = -350°$ when it should be $\Delta\phi_k = 10°$. The modulo-$2\pi$ correction circuit removes the wrap-around error.

The symbol phase angle $\Theta$ represents a differentially encoded $\pi/4$-shifted-DQPSK symbol and is decoded directly into a pair of bits using a four-phase decoder 110. The decoder 110 determines into which quadrant the corrected phase angle falls, and determines the two-bit binary value corresponding to this quadrant. The quadrants are numbered in a counter clockwise direction as 0-1-2-3. The present invention employs a Gray coded transmitted bit stream having quadrants numbered in a counter clockwise direction as 0-1-3-2. The relative phase angles can take four values corresponding to the four pairs of input bits $(X_k,Y_k)$. Table 1 indicates the mapping of the pairs of bits onto the relative phase angles, using a Gray code.

TABLE 1

| $\pi/4$-Shifted-DQPSK Relative Phase Mapping | | |
|---|---|---|
| $\Delta\phi_k$ | $X_k$ | $Y_k$ |
| $\frac{-3\pi}{4}$ | 1 | 1 |
| $\frac{+3\pi}{4}$ | 0 | 1 |
| $\frac{+\pi}{4}$ | 0 | 0 |
| $\frac{-\pi}{4}$ | 1 | 0 |

Symbol timing determined by sample index j and carrier phase adjustment estimation $\Delta\theta$ are critical in reducing the BER performance of a detector. Symbol timing estimation corresponds to determining the best sample in each symbol interval. Carrier frequency offset $\Delta\theta$ is manifested as a phase rotation of actual symbol phases. Hence, the estimation of carrier phase adjustment $\Delta\theta'$ corresponds to determining the phase adjustment per symbol period.

The present invention establishes sample timing and carrier frequency offset error correction by minimizing the error between differential phase angle of a preset synchronization word transmitted as a preamble known to the receiver and a corresponding decoded phase angle sent to the 4-phase decoder 110. The process may be mathematically represented as:

$$\min_{\{j,\Delta\theta\}} \left( \sum_{i=2}^{N_p} [\Theta_i + \Delta\theta - \Theta_i'(j)]^2 \right) \quad (7)$$

where,
j = sample index,
$\Theta_i$ = differential phase angle of $i^{th}$ symbol of preamble,
$\Delta\theta$ = carrier phase adjustment given to received signal,
$\Theta_i'(j)$ = differentially decoded phase angle corresponding to the $i_{th}$ symbol at the $j^{th}$ sampling index.
$N_p$ = number of symbols in the preamble.

If the magnitude of the phase jitter due to additive white Gaussian Noise is less than $\pi/2$ radians and there is no intersymbol interference, then the metric given by equation (7) is a rough approximation to choosing the largest maximum likelihood estimate of the signal to noise ratio for each sample time and frequency offset, averaged over the preamble.

The error minimization described by equation (7) provides an estimate of the phase adjustment per symbol. The phase adjustment per sample is the same as the phase adjustment per symbol since there is 1 sample per symbol.

The error minimization described by equation (7) is performed by adjustment circuit 120 shown in FIG. 5. Adjustment circuit 120 minimizes the error by adjustments to sample timing j and carrier phase adjustment estimation $\Delta\theta'$. These adjustments are made by performing a two-dimensional search over all sample timing adjustments j and phase adjustments $\Delta\theta'$ for the minimum error value. Adjustment circuit 120 and the loop in which it is contained functions as follows: The A/D converter circuit 10 and sorter circuit 20 output a stream of coefficients $(I_j,Q_j)$ corresponding to each successive symbol. Each symbol comprises ten samples in the present embodiment. Symbol timing is established by successive use of different sample indices j, starting from $j_{init}$, followed by error calculations pertaining to the index performed by adjustment circuit 120. The SPA circuit 30 first applies a fixed carrier phase adjustment $\Delta\theta'$ to a set of samples and produces a corresponding set of $(I_k,Q_k)$ pairs. The sample set is comprised of samples pertaining to the present index taken for all symbols in the preamble. The symbol decoding error for this set of $(I_k,Q_k)$ pairs is determined by adjustment circuit 120 according to the metric given by equation (7) and stored. The sample timing index is incremented to its next value and the process is repeated for the next sample set. This process is continually repeated until all sample sets for the first fixed carrier phase adjustment $\Delta\theta'$ have been decoded and the symbol decoding errors have been determined.

The adjustment circuit 120 then applies the next fixed carrier phase adjustment $\Delta\theta'$ to the next sample set and determines a corresponding decoding error with the use of synchronization word symbols in the preamble 166 of FIG. 2b known by the receiver. These synchronization words are used as a reference to estimate the best sample timing j and carrier phase adjustment $\Delta\theta'$ that minimizes the squared error between the relative phase angles of the reference sequence and the corresponding relative phase angles of the detected sequence. The synchronization word symbols can also be used after initial synchronization to fine tune the frame/slot synchronization.

After all fixed carrier phase adjustments $\Delta\theta'$ have been applied, the value that minimizes the symbol decoding error is determined. The symbol synchronization can be summarized as follows: Each TDMA slot position (for example the second slot 144 of FIG. 2a) has a unique synchronization word or preamble 166 (FIG. 2b) that is known to the receiver. Frame/slot synchronization as described above must be established before TDMA data 174, 178 is acquired. The coarse frame/slot position is accurate to within $\pm N_1$ samples of the correct position, where $N_1 \leq N_s/2$ and $N_s$ is the number of samples per symbol.

Having established frame/slot synchronization, $N_2$ data samples on either side of the established slot synchronization position are stored in the buffer, where $N_2 \geq N_1$. In the present embodiment $N_s = 10$ and hence 5 samples on either side are stored in the buffer. Each buffered sample is then sequentially used as the starting point by the SPA circuit 30, for locating the optimum sample timing j and carrier phase adjustment $\Delta\theta'$. This can be described as a 2-dimensional search to minimize the error described by equation (7) with respect to symbol timing j and carrier phase adjustment $\Delta\theta'$. The carrier phase rotation $\Delta\theta$ is expected to remain relatively constant over several hundred TDMA frames. Hence, for symbol synchronization, the adjustment circuit needs only to perform the 2-dimensional search for the optimum sample timing j and phase adjustment $\Delta\theta$ at start up or at hand-off, and subsequently fix the phase adjustment $\Delta\theta$ and search only for the optimum sampling instant j at the start of each time slot.

It must be noted that the correlation between the preamble 166 of FIG. 2b and decoded sequences, which is the signal sent to 4-phase decoder 110 of FIG. 5, is maximized, and not the correlation between the preamble 166 of FIG. 2b and received sequences 3 of FIG. 5. Thus the present invention corrects for the characteristics of the detector in finding the optimum sampling point j and phase adjustment $\Delta\theta'$.

Figure 7:
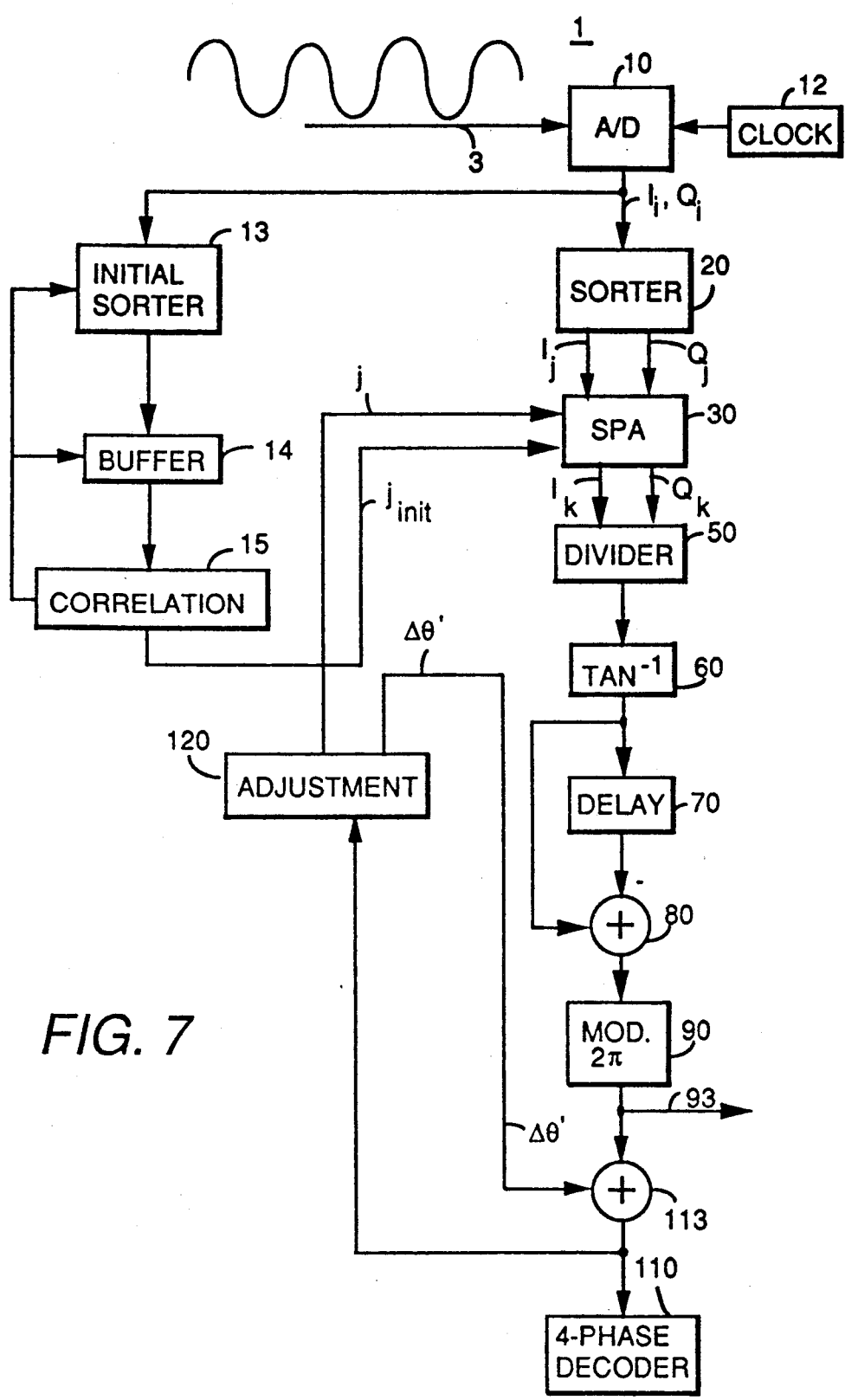
FIG. 7 is a simplified block diagram of a second embodiment of a detector of the present invention.

Since the additive white Gaussian noise is circularly symmetric, the frequency offset correction $\Delta\theta$ can be applied by a second embodiment of the invention shown in FIG. 7, which adds the corresponding phase angle $\Delta\theta'$ at the input of four-phase decoder 110. The embodiment of FIG. 7 operates in the same manner as the embodiment of FIG. 5 up to where the best sampling point j and best phase adjustment $\Delta\theta'$ have been determined. Thereafter, summer 113 receives the output samples from modulo-$2\pi$ correction circuit 90, and receives the best phase adjustment $\Delta\theta'$ from adjustment circuit 120. The summer 113 adds the best phase adjustment $\Delta\theta'$ to each sample before being sent to four-phase decoder 110. The signal from summer 113 is also passed to the adjustment circuit 120. The adjustment at summer 113 is a simple addition of signals and does not involve complex processing.

Figure 8A:
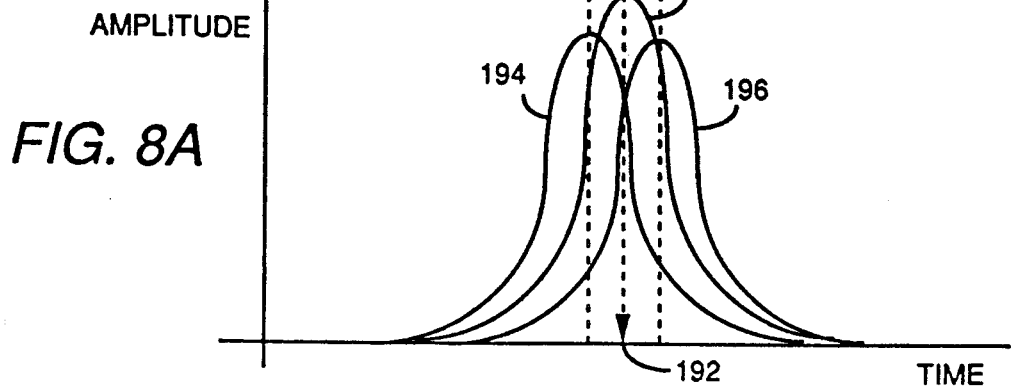
FIG. 8a, 8b and 8c are illustrations of the variation of optimal sampling points due to multipath propagation and signal fading.
Figure 8B:
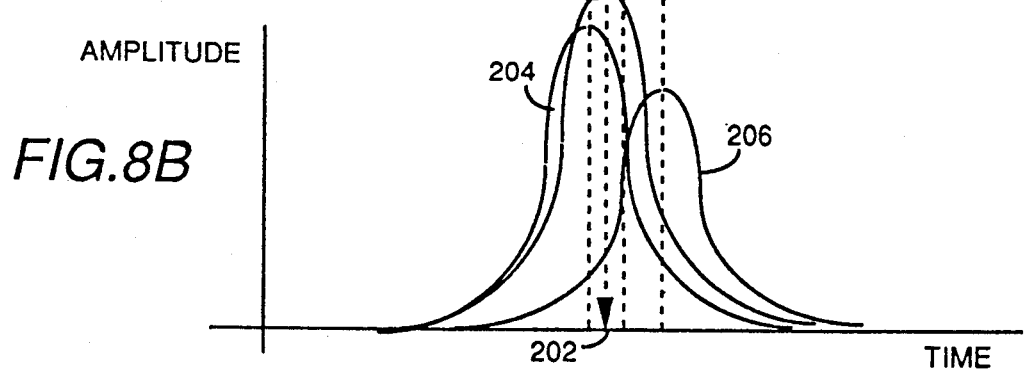
Figure 8C:
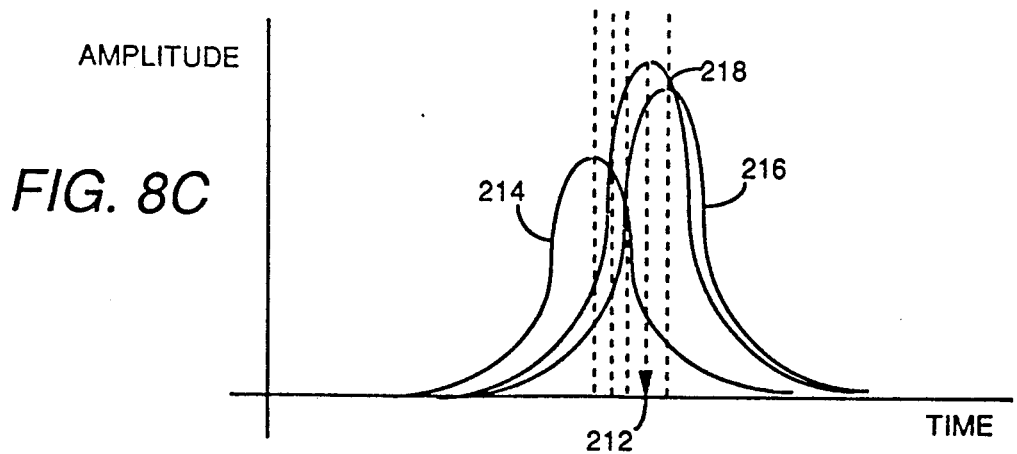

Delay spread causes symbol errors. This effect can be mitigated by using an equalizer. In the absence of an equalizer, the most intuitive way of reducing BER would be to choose an optimal sampling point to minimize the contributions of adjacent 10 symbols. FIGS. 8a, 8b, and 8c illustrate the effect of a small delay spread on the present invention. Two rays of a multipath system are assumed to be received in three different situations as illustrated by FIG. 8a, 8b, and 8c.

In FIG. 8a, an original received signal 194 is followed by a delayed signal 196, an echo, of equal amplitude. Let the optimal sampling point 192 pertain to the center of the combined waves 98. In FIG. 8b, an original received signal 204 is followed by echo 206 of lesser amplitude. Now if the optimal sampling point 202 pertains to the center of the combined waves 208, then the optimal sampling point has shifted from point 192 to 202 due to the differences in relative amplitudes between the original received signal and the echo. Similarly, FIG. 8c shows an original received signal 214 followed by echo 216 of greater amplitude. If the optimal sampling point 212 pertains to the center of the combined waves 218 in FIG. 8c, then the optimal sample timing 192, 202, 212 in each situation represented by FIGS. 8a, 8b, and 8c, respectively, varies with the relative amplitudes of the signal and the corresponding delayed signal.

The present invention implements optimal sample timing estimation, making the differential detector more robust to delay spread. However, this action is only useful for delay spreads of approximately one to two tenths of a symbol period. Moreover, the minimization performed by the adjustment circuit 120 of FIGS. 5 and 7 operates on the data of preamble sequence 166 of FIG. 2b.

The differential detector of the invention, when employed in a cellular telephone receiver, eliminates need for a described here eliminates the limiter and hence does not place severe restrictions on data rate and constraints on filtering. Elimination of the limiter by implementing the differential detector of the invention reduces the overall processing requirements. The differential detector employs an adjustment circuit 120 that performs integrated sample timing j and carrier frequency error estimation $\Delta\theta'$. The sample timing recovery scheme reduces the BER performance of the differential detector when there is a small amount of delay spread.

The present invention can be used to demodulate analog FM signals that are commonly employed in conventional FM radio broadcasts since it employs a differential demodulation scheme. To receive conventional FM radio broadcasts, the adjustment circuit 120, and the SPA circuit must be deactivated in order not to adjust the sample timing j and phase adjustment $\Delta\theta'$. An output 93 of the modulo-$2\pi$ correction circuit 90 of FIGS. 5 and 7 is used as the output of the detector. The number of samples per symbol must also be increased. The detector now serves as a frequency discriminator and can be used for receiving analog FM radio signals.

Figure 2:
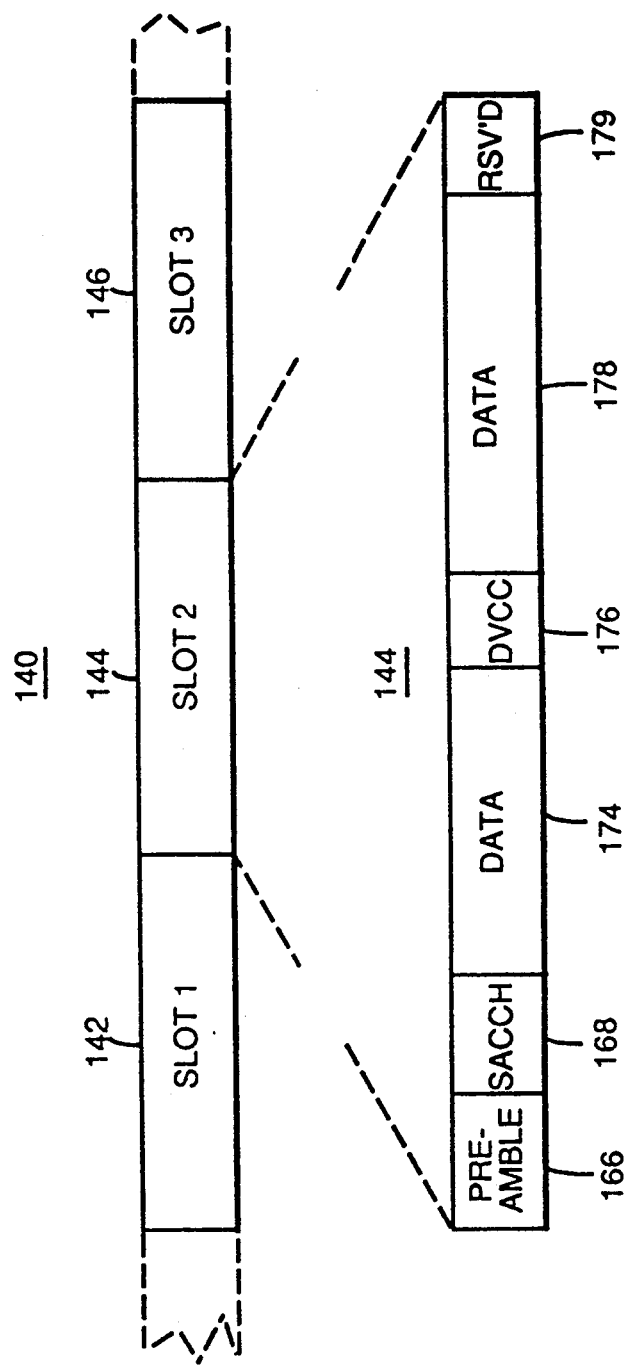
FIG. 2a illustrates a TDMA frame structure.
FIG. 2b illustrates the Electronics Industries Assoc. IS-54 slot structure for base station to mobile station transmission.

The TDMA frame structure 140 and slot structure 144 shown in FIG. 2, were used in a simulation. A slot duration of 6.67 ms was employed. The data rate used was 48.6 kbps. A 14 symbol preamble was used. The frame and slot synchronization was simulated to be within ±0.5 symbols of the desired sample position. The frequency offset was varied to be within 900 Hz of the true value. The sample timing j and carrier phase adjustment $\Delta\theta'$ estimations were performed once for each slot 144, over the preamble 166.

Figure 9:
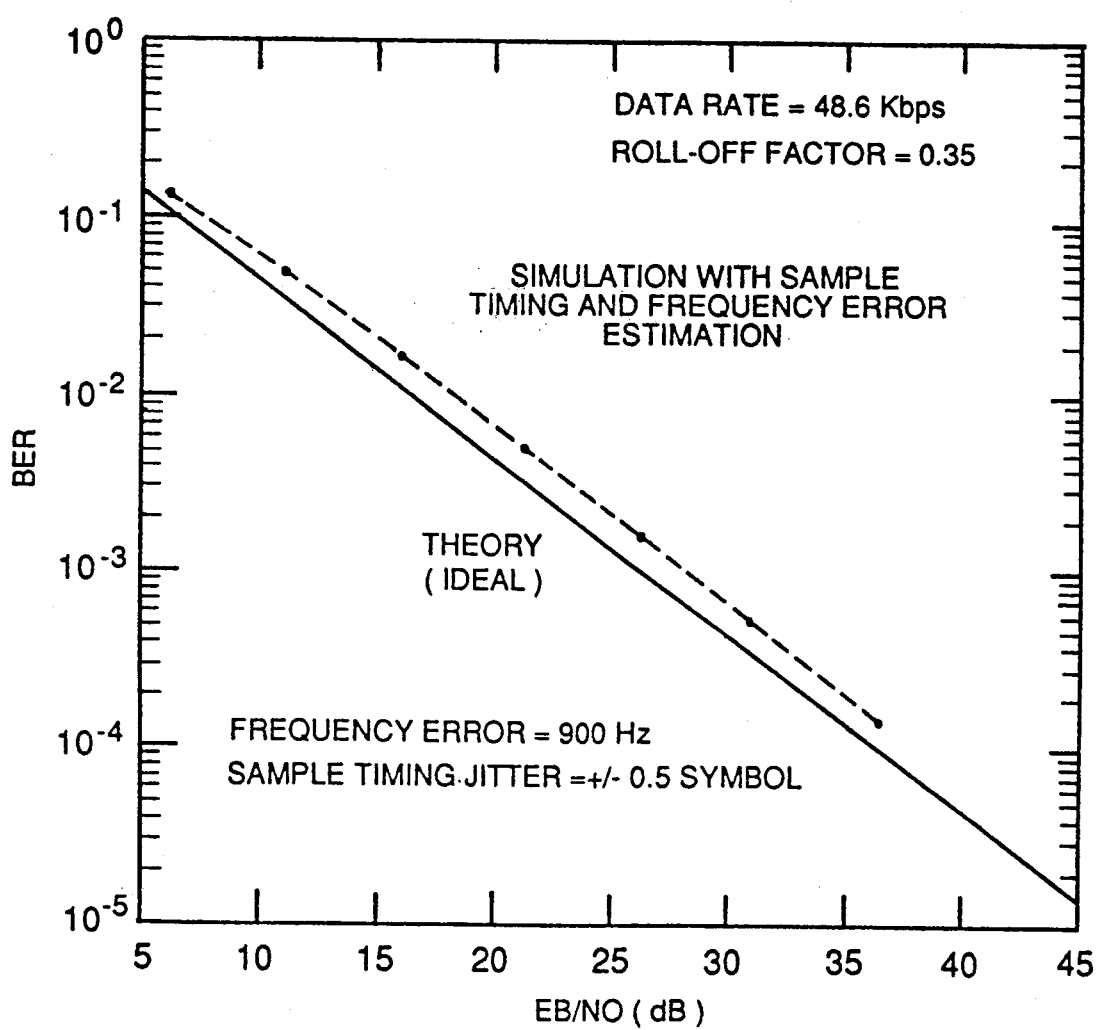
FIG. 9 illustrates the bit error rate (BER) performance of the detector under flat Rayleigh fading, considering the effects of sample timing recovery and frequency error correction.
Figure 10:
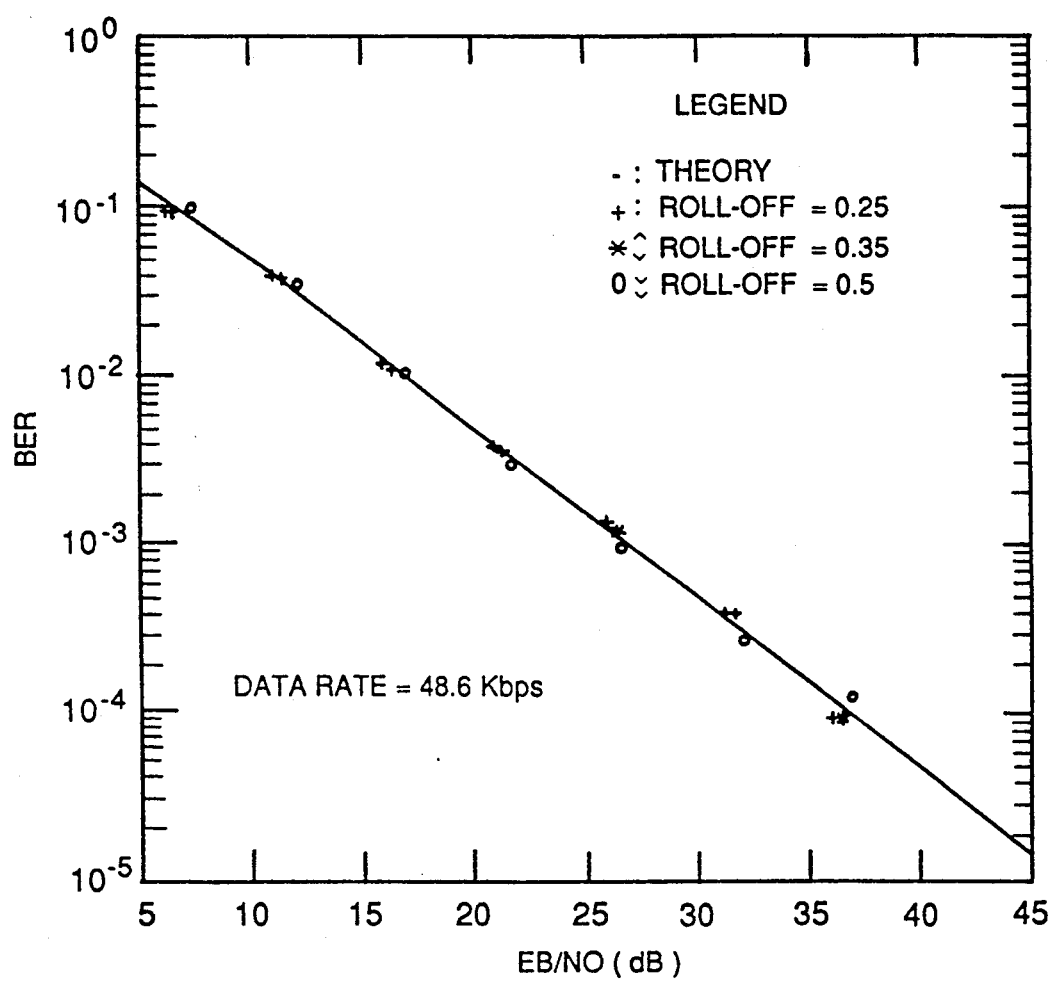
FIG. 10 illustrates the BER performance of the detector for different transmission pulse roll-off factors.

FIGS. 9 and 10 illustrate the BER performance in a static and a flat Rayleigh fading channel, respectively, with regard to synchronization and pulse shaping roll-off factor sensitivity. It is seen that the detector is insensitive to the pulse shaping roll-off factor and is within 2 dB of the theoretical performance at a BER of 0.1%.

The foregoing describes a digital radio receiver that avoids the need for a limiter by incorporating detector having an adjustment circuit that adjusts sampling timing and carrier phase adjustment. The BER performance of the detector is such that it can be used in mobile receivers where complexity has to be low and where the delay spread is less than 0.2 of a symbol duration. The detector will also be useful in portable radio applications where complexity is low and delay spread relative to the symbol period does not exceed 10%.

The detector can receive conventional analog FM radio broadcasts by deactivating the adjustment circuit, the SPA circuit and the four-phase decoder. The detector also can also decode other digital modulation schemes, such as four-level digital FM and four-level continuous phase frequency shift keying (CPFSK) with modulation index h=0.25, which can be represented as quadrature phase signals.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. In a receiver of a cellular telephone for receiving phase angles encoded in a received signal, a digital discriminator, said discriminator comprising:
   a) a heterodyne circuit adapted for converting said received signal to an intermediate frequency (IF) signal;
   b) an analog to digital (A/D) converter circuit coupled to the heterodyne circuit adapted for sampling said IF signal and for creating a digital output signal having of a plurality of samples, each sample comprising a quadrature coefficient signal and an in-phase coefficient signal;
   c) a sorter circuit coupled to receive the digital signal from the A/D converter and adapted to provide a predetermined number of samples for decoding;
   d) means for producing an initial sample index;
   e) a sample and phase adjustment (SPA) circuit coupled to the sorter circuit adapted for receiving the samples of the sorter circuit, coupled to the means for producing an initial sample timing index, receiving a sample timing index, selecting samples for decoding based upon the sample timing index, receiving a carrier phase adjustment, and creating a set of output samples based upon the selected samples and carrier phase adjustment, each SPA output sample comprising a quadrature coefficient and an in-phase coefficient;
   f) a relative phase angle providing means adapted for providing a set of relative phase angle samples from the set of output samples from the SPA circuit, the relative phase angle providing means coupled to the SPA circuit;
   g) a modulo-$2\pi$ correction circuit coupled to the relative phase angle providing means adapted for receiving the relative phase angle samples, correcting for phase angles which wrap-around the real axis and creating a set of corrected relative phase angle samples;
   h) a four-phase decoder circuit coupled to the modulo-$2\pi$ correction circuit adapted for receiving the set of corrected relative phase angle samples and decoding the samples into a pair of decoded bits; and
   i) an adjustment circuit coupled to receive the signal sent to the four-phase decoder circuit adapted to calculating a decoding error between the decoded phase angle for each symbol in a preamble and a respective one of a predetermined set of phase angles stored by the adjustment circuit, and adjusting the sample timing and carrier phase adjustment to minimize the decoding error.

2. The receiver of a cellular telephone of claim 1 wherein the means for providing a set of relative phase angle samples comprises:

a) a divider circuit coupled to the SPA circuit adapted for receiving each quadrature coefficient, and dividing it by its corresponding in-phase coefficient to create output samples, each output sample representing a tangent of the signal phase angle;

b) an inverse tangent circuit coupled to the divider circuit adapted for receiving the tangents of the signal phase angle and create an output samples each representing a decoded phase angle for a tangent;

c) a delay circuit coupled to the inverse tangent circuit adapted for receiving and delaying the decoded phase angles until a subsequent phase angle is decoded; and d) a summer circuit coupled to the inverse tangent circuit and the delay circuit adapted for receiving the output samples of the inverse tangent circuit, for receiving the output samples of the delay circuit, and
subtract each output sample of the delay circuit from the corresponding output sample of the inverse tangent circuit to create a set of relative phase angle samples.

3. The receiver of claim 1 wherein the A/D converter is adapted to sample at a rate being at least four times the intermediate frequency.

4. The receiver of claim 2 wherein the adjustment circuit is adapted to adjust the sample timing index and carrier phase adjustment at the start of a frame to determine the best sample timing index and carrier phase adjustment, and once found, keeps the carrier phase adjustment constant and varies the sample timing adjustment during subsequent time slots, thereby allowing a frame/slot synchronization followed by symbol synchronization.

5. The receiver of claim 4 wherein the received signal is a conventional analog FM radio signal, one sample/symbol is processed, the adjustment and SPA circuits are deactivated so as to be non-functional, and the output signal of the modulo-$2\pi$ correction circuit is coupled directly to an FM output, such that the output signal of the modulo-$2\pi$ correction circuit bypasses the four-phase decoder and is passed directly to the FM output and constitutes a decoded conventional analog FM signal.

6. The receiver of claim 1 further comprising a predecoding summer coupled to receive the best carrier phase adjustments from the adjustment circuit and the output signal $2\pi$ correction circuit and add the best carrier phase adjustment to each sample of the output signal of the modulo $2\pi$ correction circuit thereby compensating for decoding error in each sample to be decoded by the four-phase decoder.

* * * * *